(12) United States Patent  (10) Patent No.: US 8,282,117 B2
Rodgers  (45) Date of Patent: Oct. 9, 2012

(54) TRAILER HITCH FOR USE ON A BICYCLE AND A TRAILER ASSOCIATED THEREWITH

(76) Inventor: Stephan M Rodgers, Broomfield, CO (US)

(*) Notice: Subject to any disclaimer, the term of this patent is extended or adjusted under 35 U.S.C. 154(b) by 0 days.

(21) Appl. No.: 13/023,572

(22) Filed: Feb. 9, 2011

(65) Prior Publication Data

US 2012/0200059 A1 Aug. 9, 2012

(51) Int. Cl.
*B62K 27/00* (2006.01)
*B62K 27/12* (2006.01)

(52) U.S. Cl. ........................................ 280/204; 280/292

(58) Field of Classification Search .................. 280/32.7, 280/202, 203, 204, 288.4, 292, 656
See application file for complete search history.

(56) References Cited

U.S. PATENT DOCUMENTS

| | | | | |
|---|---|---|---|---|
| 4,266,793 A * | 5/1981 | Pryor | ............................ | 280/204 |
| 5,303,944 A * | 4/1994 | Kalmus | ..................... | 280/288.4 |
| 5,749,592 A * | 5/1998 | Marchetto | ..................... | 280/292 |
| 6,099,008 A * | 8/2000 | Caffey | ........................... | 280/204 |
| 6,099,011 A * | 8/2000 | Beaudoin et al. | ............. | 280/292 |
| 6,305,703 B1 * | 10/2001 | Quick et al. | ................... | 280/204 |
| 6,349,955 B1 * | 2/2002 | Cottard et al. | ................ | 280/204 |
| 6,349,958 B1 * | 2/2002 | Gawlik | ......................... | 280/293 |
| 6,481,735 B1 * | 11/2002 | Hilk | .............................. | 280/204 |
| 7,131,657 B1 * | 11/2006 | Witt | .............................. | 280/292 |
| 7,503,573 B2 * | 3/2009 | Finlaw et al. | ................. | 280/202 |
| 2001/0052686 A1 * | 12/2001 | Galik | ............................ | 280/292 |
| 2003/0011170 A1 * | 1/2003 | Humes | ......................... | 280/504 |
| 2004/0173988 A1 * | 9/2004 | Britton et al. | ................ | 280/204 |
| 2006/0186634 A1 * | 8/2006 | Giese | ........................... | 280/292 |
| 2007/0257467 A1 * | 11/2007 | Chuang | ........................ | 280/292 |
| 2009/0256329 A1 * | 10/2009 | Sather | .......................... | 280/204 |

* cited by examiner

*Primary Examiner* — Lesley D Morris
*Assistant Examiner* — Marc Scharich
(74) *Attorney, Agent, or Firm* — Leyendecker & Lemire, LLC; Kurt Leyendecker

(57) ABSTRACT

Embodiments of the present invention comprise a bicycle trailer hitch for use in securing a bicycle trailer to a bicycle. Unlike prior art trailer hitches the transfer of most of the load between a bicycle and an associated bicycle trailer during use does not pass through the bolt/fastener used to couple the bicycle attachment section to the trailer attachment section thereof. Rather, the majority of the load is transferred through a direct connection between the respective sections.

19 Claims, 6 Drawing Sheets

TRAILER HITCH FOR USE ON A BICYCLE AND A TRAILER ASSOCIATED THEREWITH

BACKGROUND

Bicycles are more popular than ever as both a means of exercise and with seemingly ever increasing gas prices, as an energy efficient means of transportation. One of the biggest problems with bicycle transportation is the bicycle's limited cargo carrying capability.

A bicycle trailer is sometimes used to augment the cargo carrying capacity of a bicycle. Bicycle trailer designs exist for both carrying inanimate cargo as well as children. One example of a bicycle trailer that is designed to carry a child and even permit the child to partake in the propulsion of the bicycle/trailer combination is described in U.S. Pat. No. 7,845,664 which is incorporated herein in its entirety by reference.

Typically, a trailer is attached to an associated bicycle at its seatpost by a hitch assembly that permits the trailer being towed therebehind the ability to move/pivot vertically and laterally relative to the bicycle while in use. Most trailer hitch assemblies comprise three major components: (i) a bicycle attachment section; (ii) a trailer attachment section, which may be permanently secured to a frame section of the trailer; and (iii) a means for coupling the bicycle and trailer sections together, such as a quick release axle.

In most prior art designs the bicycle attachment section comprises a cylindrical and tubular portion that is received over the shaft of the seatpost. Often the fit between the tubular portion and the seatpost shaft permits the bicycle attachment section to pivot relative to the shaft's longitudinal axis thereby permitting the associated trailer to move laterally relative to the bicycle during use. The bicycle attachment section also includes a horizontally orientated bore through which a shaft or bolt of the coupling means can be received.

The trailer attachment section is often fixedly coupled to a frame of the trailer through welding, adhesive bonding, rivets and/or threaded fasteners to provide a secure link therewith. A front portion of the trailer attachment section is configured to interface with the portion of the bicycle attachment section having the horizontally orientated bore. The front portion also includes a horizontally orientated bore that is configured to align with the bore of the bicycle attachment section and receiving the coupling means therethrough. In many prior art hitch designs, one of the front portion of the trailer attachment section or a portion on the bicycle attachment section comprises a clevis and the other of the two comprises a protrusion that is received within the clevis.

As indicated above, the coupling means typically comprises a bolt that is received through the aligned bores and acts to transfer load between the bicycle and trailer attachment sections. The sections are also configured to pivot about the longitudinal axis of the bolt giving the associated trailer vertical compliance relative to the bicycle. In some hitches the bolt comprises a threaded fastener that is utilized in combination with a corresponding threaded nut. In other circumstances, the shaft is part of a quick release mechanism as is often used to secure the wheels of a bicycle to its frame and fork. Advantageously, the use of a quick release mechanism enables a user to easily detach the trailer attachment section from the bicycle attachment section without the use of tools to more easily facilitate use of the bicycle without the trailer.

A quick release mechanism used to secure a wheel to a bicycle is subject to very little dynamic loading and only a moderate to small amount of static loading. Rather, the loads experienced by a wheel during use are transferred to the frame of the bicycle by way of the wheels axle through which the quick release bolt passes. A relatively small tensile load is applied to the quick release mechanism's shaft when the quick release lever is closed and the associated nuts are compressed against the dropouts of the respective fork or frame to secure the wheel in place. In contrast, all load transferred through the bicycle to the trailer is transferred through the shaft of the quick release mechanism. These loads can become significant especially when one of the bicycle and the trailer twists relative to a longitudinal axis of the combined bicycle and trailer and the bolt resists the twisting by bracing up against the wall of the respective bores.

As can be appreciated, the failure of the bolt could have serious consequences freeing the trailer from the bicycle at an inopportune time. The passenger in the trailer could be injured even seriously. Further, a runaway trailer could hit people or objects causing injury and damage thereto.

DETAILED DESCRIPTION

Figure 1:
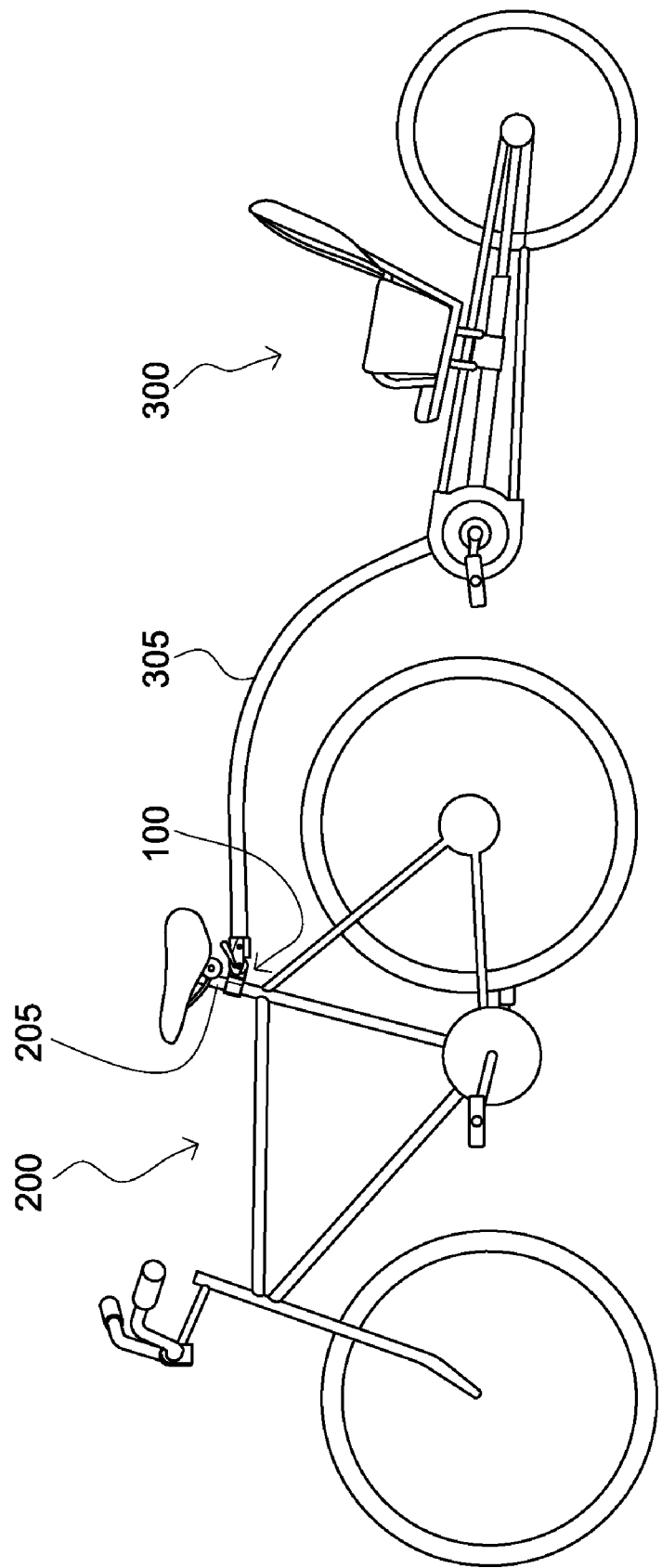
FIG. 1 is a side view of a bicycle attached to a single passenger recumbent bicycle trailer by a hitch according to one embodiment of the present invention.

Embodiments of the present invention comprise a bicycle trailer hitch for use in securing a bicycle trailer to a bicycle. Unlike prior art trailer hitches the transfer of most of the load between a bicycle and an associated bicycle trailer during use does not pass through the bolt/fastener used to couple the bicycle attachment section to the trailer attachment section thereof. Rather, the majority of the load is transferred through a direct connection between the respective sections.

In some embodiments, the direct connection is facilitated by the removable coupling of a horizontally-orientated cylindrical portion that extends rearwardly from the bicycle attachment section with a corresponding horizontally-orientated cylindrically-shaped cavity that extends forwardly of the trailer attachment section. Each of the cylindrical portion and the cylindrical cavity portion include at least one bore that extends horizontally and aligns with the bore(s) of the other portion to receive a bolt therethrough to secure the bicycle attachment section to the trailer attachment section. In at least one variation, the bolt is part of a quick release mechanism.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "integrate" or "integrated" as used in this specification and the appended claims refers to a blending, uniting, or incorporation of the identified elements, components or objects into a unified whole. As used herein "unitary" refers to a part or component comprised of a single piece.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The phrase "bicycle trailer" as used herein refers to any wheeled apparatus configured to be pulled by a bicycle.

The term "bicycle" as used herein refers to any wheeled human powered vehicle.

The terms "hitch" and "trailer hitch" as used herein refer to an assembly that is adapted to couple two or more vehicles together to facilitate the transfer of acceleration and deceleration from one vehicle to the other. As used herein the term "vehicle" refers to both propelled vehicles, such as bicycles, sleds, automobiles and boats, and vehicles that rely on another vehicle to provide for propulsive movement, such as trailers.

The phrases, "effective cavity longitudinal center axis" and "effective cavity diameter" in reference to the "cavity portion", which has the shape of a partial cylinder, refers to the diameter and center axis that a whole or complete cylinder extrapolated from the partial cylinder shape would have. "Partial cylinder" as used herein refers to a portion of a cylinder dissected along at least one longitudinally-extending plane.

An Embodiment of a Trailer Hitch

An embodiment of a trailer hitch 100 that can be used to couple a bicycle to a bicycle trailer is illustrated in whole or part in FIGS. 2-9. FIG. 1 is an illustration of a bicycle 200 coupled to a recumbent trailer cycle 300 using the hitch illustrated in FIGS. 2-9.

Figure 2:
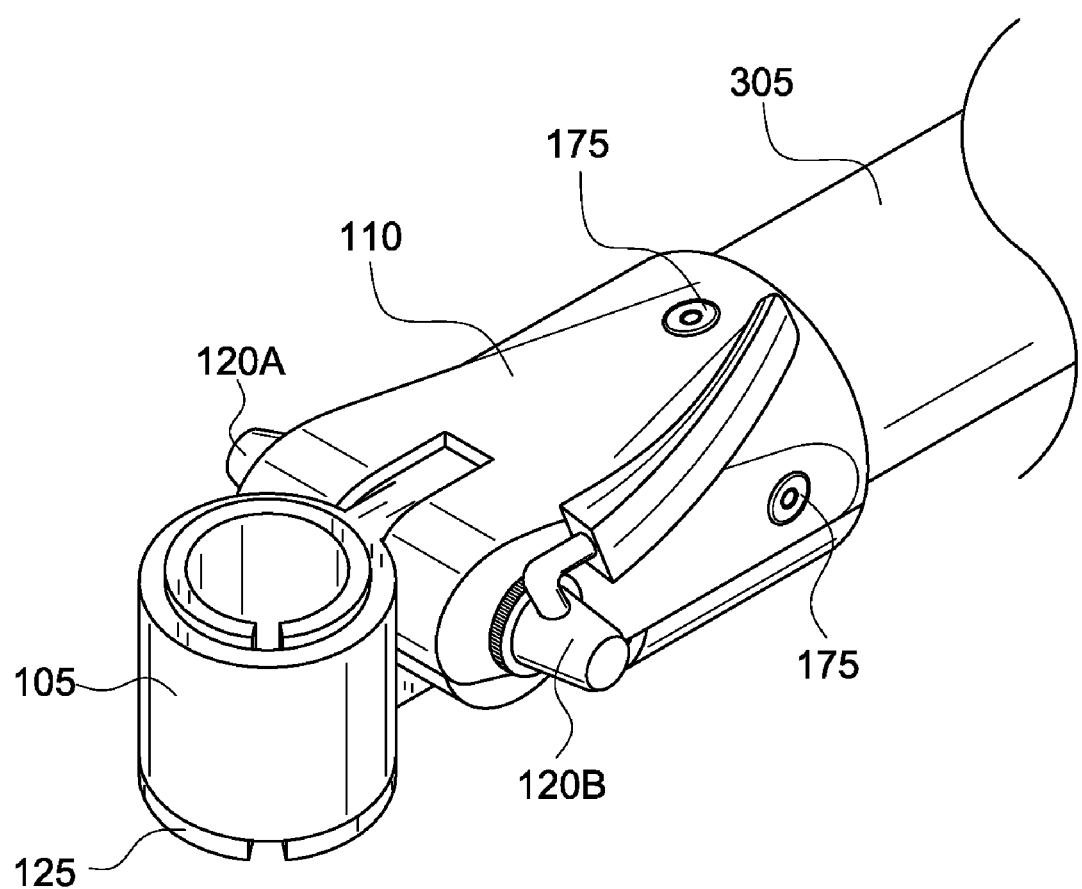
FIG. 2 is an isometric view of a bicycle trailer hitch according to one embodiment of the present invention.
Figure 3:
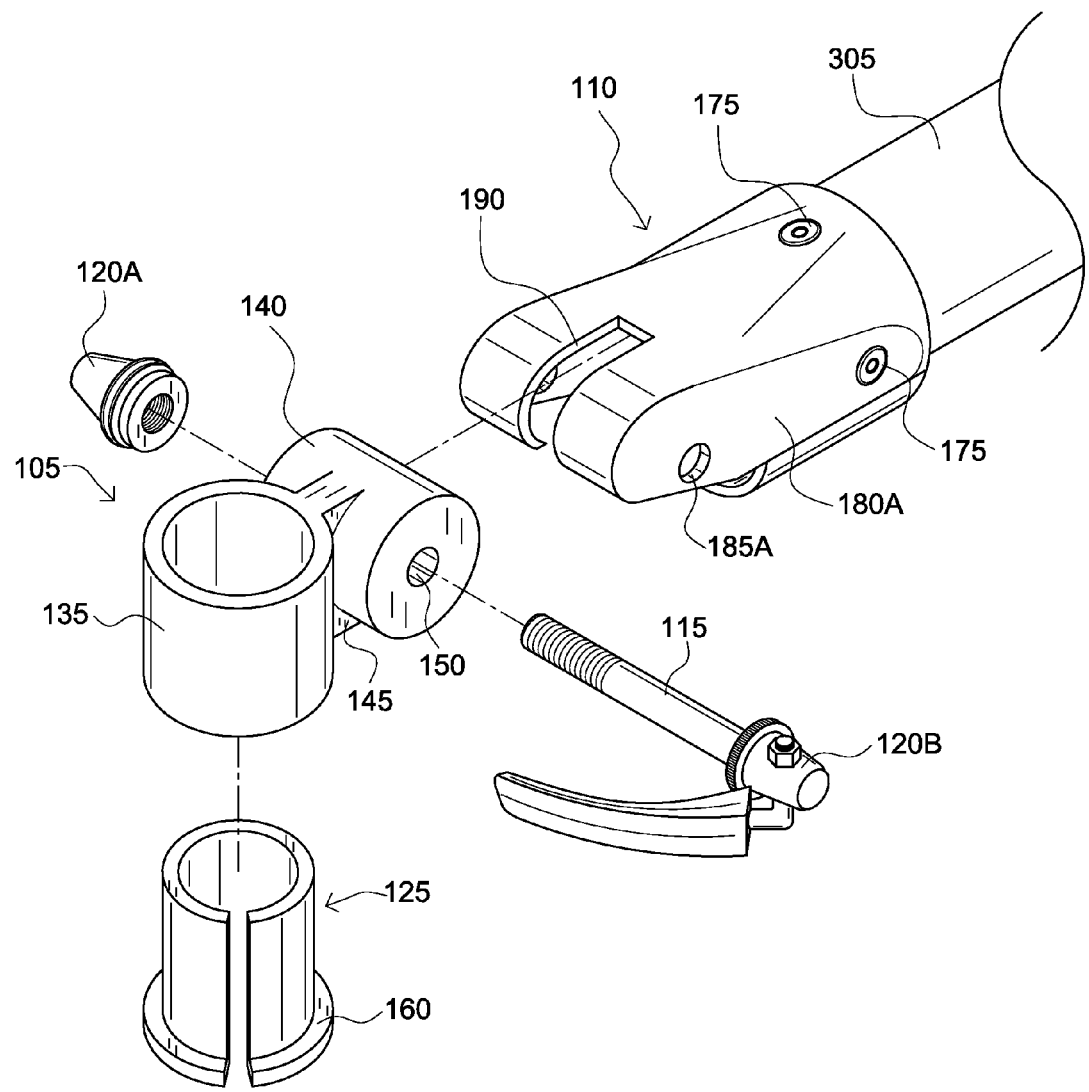
FIG. 3 is an exploded view of a bicycle trailer hitch according to one embodiment of the present invention.

As best shown in FIGS. 2 and 3, the major components of the trailer hitch 100 include: (i) a bicycle attachment section 105 that couples with a bicycle 200 typically through the shaft of a seatpost 205 (see FIG. 1); (ii) a trailer attachment section 110 that may be fixedly secured to a front frame section 305 of a bicycle trailer 300; and (iii) a coupling or fastening means typically comprising a bolt 115, such as is shown as part of a quick release assembly including an end nut 120A and a lever actuated cam head 120B. Additionally, as necessary depending on the particular size of seatpost around which the bicycle attachment section will be received, a cylindrical spacer 125 can be used to span the difference between the outside diameter of the seatpost and the inside diameter of the corresponding tubular portion 135 of the bicycle attachment section.

Figure 4:
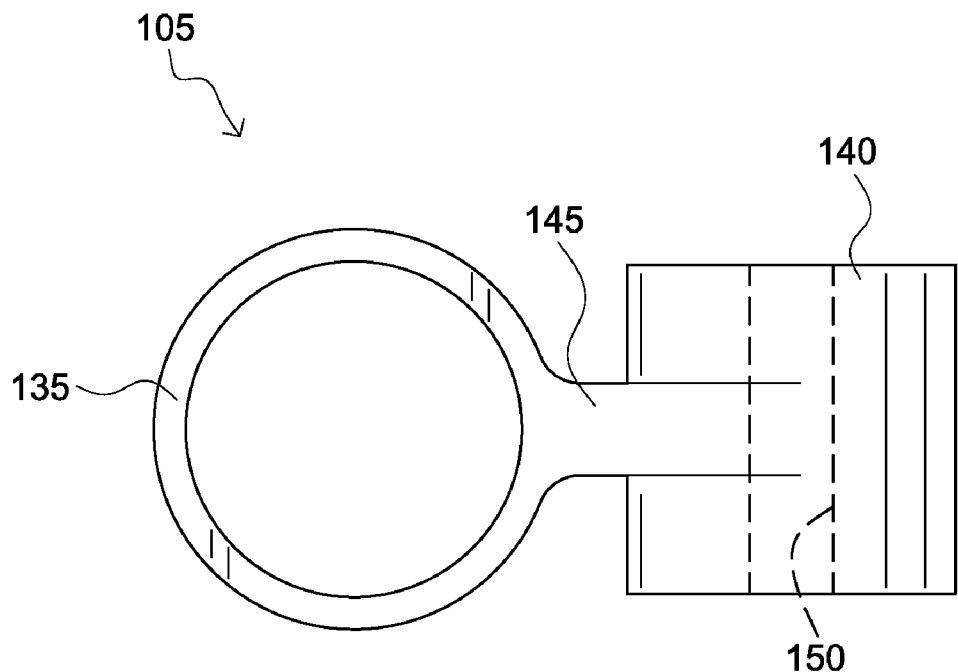
FIG. 4 is a top view of a bicycle attachment section of the bicycle trailer hitch according to one embodiment of the present invention.
Figure 5:
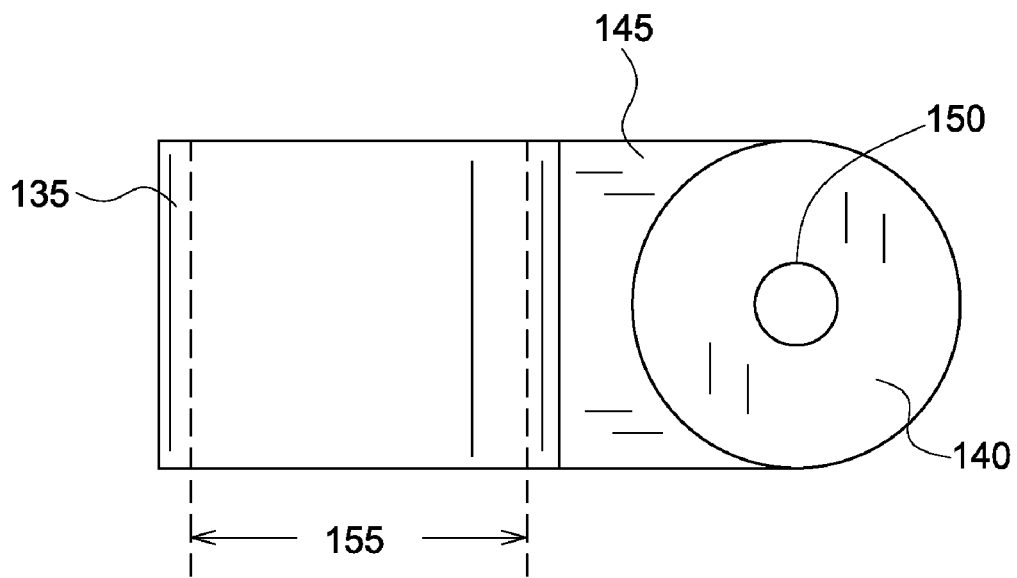
FIG. 5 is a side view of a bicycle attachment section of the bicycle trailer hitch according to one embodiment of the present invention.
Figure 6:
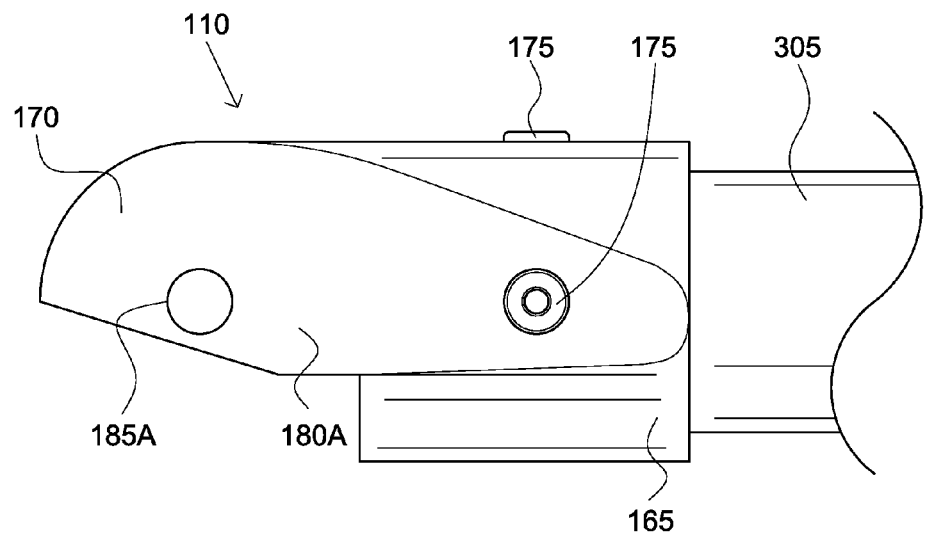
FIG. 6 is a side view of a trailer attachment section of the bicycle trailer hitch according to one embodiment of the present invention.

The bicycle attachment section 105 is specifically illustrated in FIGS. 4 and 5. In at least one embodiment, the section comprises a single unitary piece although multi-piece variations are contemplated. Some variations are made of metal, such as aluminum, magnesium or steel alloys, wherein they are cast forged and/or machined. Other variations are comprised of reinforced or unreinforced polymeric material that is molded into the final form using well know processes.

The bicycle attachment section essentially comprises three distinct interconnected portions: (a) a tubular portion 135 that is configured to be received over the shaft of a bicycle's seatpost; (b) a horizontally-orientated cylindrical portion 140 with a bore 150 extending therethrough that is coincident with the center axis of the cylindrical portion; and (c) a bridge portion 145 connecting and spanning between the tubular portion and the cylindrical portion.

In at least one embodiment, the inside diameter 155 of the tubular portion 135 is about 1.50" permitting the bicycle attachment section to easily fit over substantially all the commonly available seatposts 205 currently on the market at the time this document was prepared. However, permitting the bicycle attachment section 105 with an inside diameter much greater than the seatpost shaft's outside diameter to freely move back and forth and up and down during use and repeatedly impacting the sides of the seatpost shaft could cause damage to the shaft as well as the collar of bicycle frame's seat tube where the seatpost shaft is received therein. Accordingly, to take up the excess space, protect the frame and shaft, and provide a bearing surface to facilitate rotation of the tubular portion relative to the seatpost shaft, a cylindrically-shaped spacer 125 of a predetermined thickness is provided. For instance where the bicycle uses a 1.25" post, a spacer having a wall thickness of about 0.125" is specified. The spacer is typically made of a polymeric material, such as but not limited to nylon and polypropylene, to both minimize the risk of damage to the underlying seatpost shaft, which can be comprised of a composite material, and to provide a bearing surface to facilitate the rotation of the tubular portion 135 relative to the seatpost shaft as the bicycle 200 negotiates turns during use. A circumferential flange 160 is provided on one end of the spacer to provide an interface between the bicycle attachment section 105 and the seatpost collar located at the top of the frame's seat tube. Further the spacer is typically split along a longitudinally extending edge to allow it to move and accommodate seatpost shafts and tubular portions with slightly differing diameters.

In one embodiment of the bicycle attachment section, the cylindrical portion 140 has a length of about 1.5" along its longitudinal center axis and an outside diameter of about 1.25" although as with all dimensions provided herein they can vary between variations and embodiments. The cylindrical portion is substantially perpendicular the tubular portion giving it a horizontal orientation relative the ground when the bicycle attachment section 105 is installed on a bicycle. The bore 150 is provided along the longitudinal center axis of the cylindrical portion to receive the bolt or shaft 115 of the coupling means therethrough.

As indicated above the tubular portion 135 and the cylindrical portion 140 are joined by way of a bridge portion 145 that spans between them. The bridge portion essentially comprises a planar member about 0.5" thick that is generally vertically orientated or perpendicular to the cylindrical portion. It is located at and interfaces with the outside of the cylindrical portion over about a 180 degree arc proximate the longitudinal midpoint thereof. The bridge portion interfaces with the outside surface of the tubular portion along a substantially linear front edge that is substantially parallel to the center axis of the tubular portion.

An embodiment of the trailer attachment section 110 is illustrated in FIGS. 6-9. In at least one embodiment, the section comprises a single unitary piece although multi-piece variations are contemplated. Some variations are made of metal, such as aluminum, magnesium or steel alloys, wherein they are cast forged and/or machined. Other variations are comprised of reinforced or unreinforced polymeric material that is molded into the final form using well know processes.

The trailer attachment section 110 essentially comprises two portions: (1) a trailer frame interface portion 165 at its back or distal end; and a cylindrical cavity portion 170 at its front or proximal end.

The trailer frame interface 165 is configured to fixedly interface with a front frame section or other section of an associated trailer 300. The section may or may not be removable from the trailer, and as such, may essentially be part of the trailer itself. As shown, the trailer frame interface comprises a cylindrical opening into which a cylindrical tube 305 of the trailer frame is received. The trailer attachment section is secured to the cylindrical tube by way of three rivets 175. As would be appreciated by those of ordinary skill in the art given the benefit of this disclosure, other connection means may be used depending on the nature/configuration of the frame member to which the trailer attachment section is coupled. For instance, if the frame member at the interface location is a plate then the interface portion might comprise a corresponding plate adapted to overlap the frame plate. It is further appreciated that the exact means of joining the frame and the attachment section can vary as well. For instance, the two pieces can be adhesively bonded, welded, brazed, swaged, pinned or bolted together.

As indicated above, the cylindrical cavity portion 170 is located at the proximal or front end of the trailer attachment section 110 and defines downwardly facing cavity that has the shape of a partial cylinder (most typically a half cylinder) and is bounded on the left and right edges by left and right sidewalls 180A&B. As can be seen best in FIG. 9, the cavity and the associated left and right sidewalls extend downwardly beyond the effective longitudinal center axis 183 of the hypothetical cylinder from which the cavity is derived and aligned bores 185A&B are provided in each sidewall having bore axis 187 that are coincident with the effective longitudinal center axis.

Of note, the effective diameter of the cavity is complementary to the diameter of the cylindrical portion 140 of the bicycle attachment section such that the cylindrical portion nests into the cavity portion 170 with outside surface of the cylindrical portion in general contact with the surface of the cavity portion when the bore 150 of the cylindrical portion is aligned with the bores 185A&B of the sidewalls 180A&B. The width of the cavity (or length of the semi-cylinder) is also similar to the width of the cylindrical portion (or length of the cylinder) of the bicycle attachment section, such that the ends of the cylindrical portion lightly contact the inside surfaces of the sidewalls when the cylindrical portion is placed in the cavity. It is through the contact between the cavity portion and the cylindrical portion that load is transferred between the respective hitch sections during use.

Figure 7:
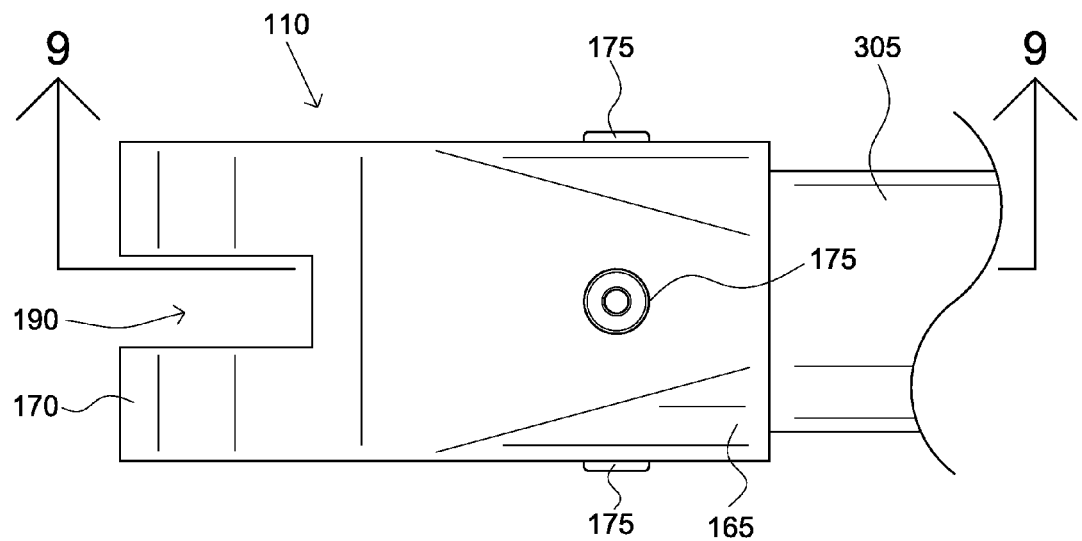
FIG. 7 is a top view of a trailer attachment section of the bicycle trailer hitch according to one embodiment of the present invention.
Figure 8:
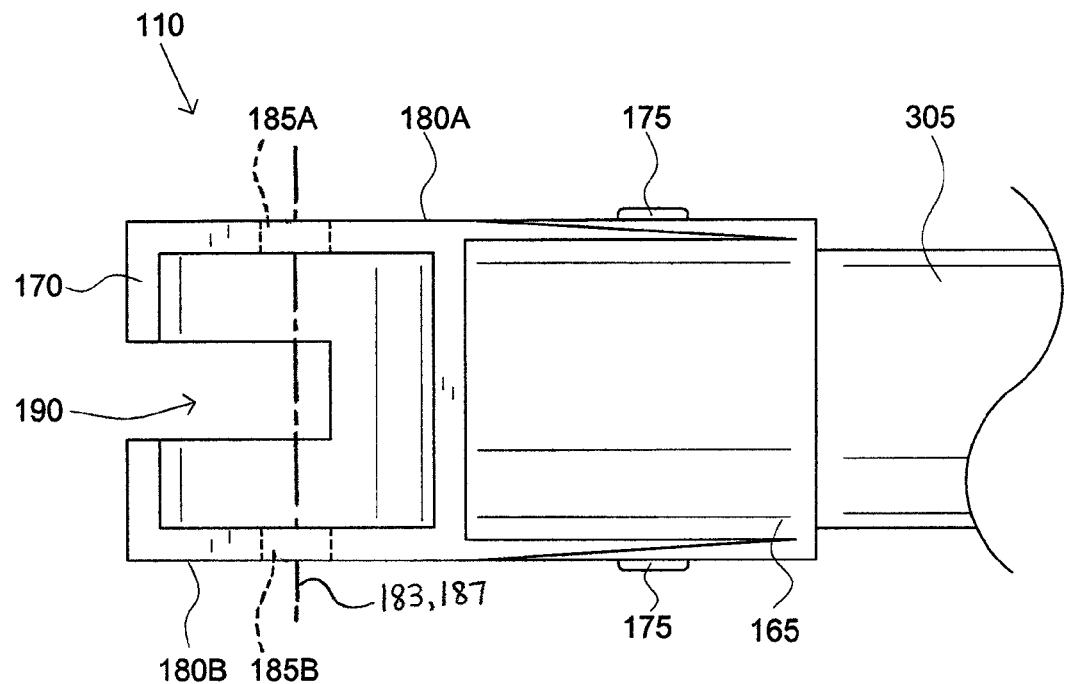
FIG. 8 is a bottom view of a trailer attachment section of the bicycle trailer hitch according to one embodiment of the present invention.
Figure 9:
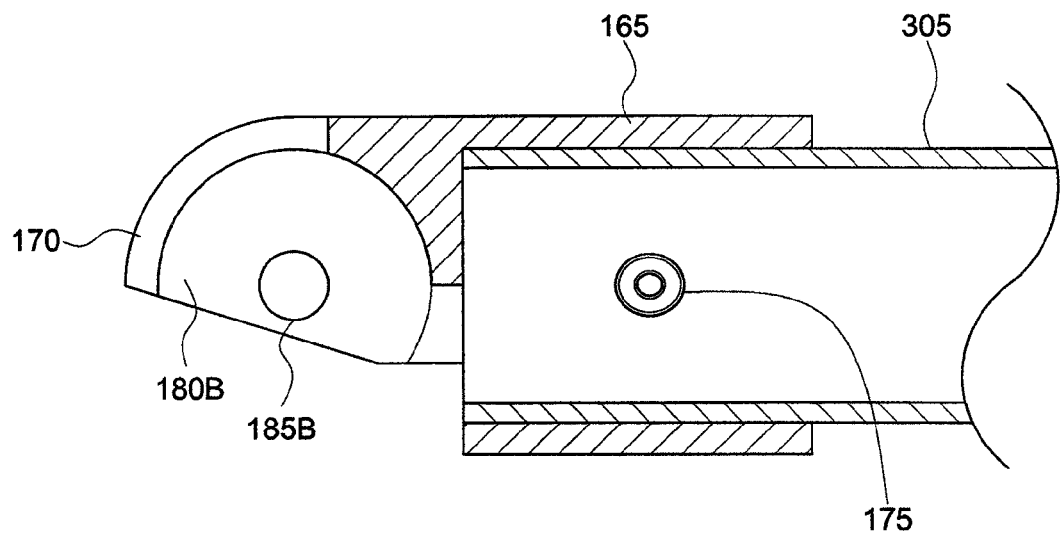
FIG. 9 is a cross sectional view of the trailer attachment section of the bicycle trailer taken along line 9-9 of FIG. 7 according to one embodiment of the present invention.

As can best be seen in FIGS. 7 and 8, an elongated circumferentially-extending notch 190 is provided in the wall of the cylindrical cavity portion 170 extending rearwardly from a front edge thereof. The notch has a circumferential length subtended by an angle of about 80-110 degrees on the cylindrical cavity portion and a width at least slightly greater than the width of the bridge portion 145 of the bicycle attachment section 105 such that the bridge portion 145 can be freely received therein.

To join the respective sections together, the cylindrical portion 140 is received within the cavity portion 170 aligning the respective bores of each and a bolt/shaft 115 of the coupling means is slid through the bores and secured. The coupling means illustrated in FIG. 3 comprises an appropriately sized quick release mechanism 115, 120A & 120B wherein a lever is rotated to activate a cam to tighten and loosen the connection. In the alternative, a simple threaded nut can be used or even a shaft and associated cotter pins. The coupling mechanism acts merely to hold the cylindrical portion in the cavity portion with very little dynamic loading being incident on the coupling means itself.

When the bicycle attachment section 105 is properly coupled with the trailer attachment section 110 as shown in FIG. 2 to join a bicycle 200 with an associated bicycle trailer 300, the trailer attachment section is free to rotate or pivot upwardly about 45-60 degrees and downwardly about 90 degrees allowing the trailer to move vertically upwardly and downwardly relative to the bicycle. In addition, the tubular portion of the bicycle attachment section is able to pivot to accommodate turning the bicycle/trailer combination while in use. When torsional forces are applied to one of the bicycle and the trailer relative to the other, the large contact area between the cavity portion and the cylindrical portion helps resist the loads to maintain the proper vertical orientation of both the bicycle and trailer without significant loading of the quick release shaft as might be experienced under similar loading conditions on prior art hitches.

An Embodiment Comprising a Bicycle Trailer Including a Hitch with or without a Bicycle in Combination FIG. 1 is an illustration of a bicycle 200 and bicycle trailer 300 combination wherein the bicycle and trailer are coupled with an embodiment of the hitch 100 described above.

The illustrated bicycle trailer is a trailer cycle as described in U.S. Pat. No. 7,845,664; however, the hitch can be utilized with any suitable type of trailer including but not limited to those intended to carry a person, such as a child, and/or cargo. As discussed above and as shown, the trailer attachment section is fixed to a cylindrical frame member of the trailer cycle by receiving the tube in tubular recess in the trailer attachment section. Numerous variations and modifications are contemplated to permit the trailer attachment section to couple to a component and/or frame member of a bicycle trailer depending on the particular design of the trailer.

In some embodiments of the hitch, the structure that provides for lateral compliance of the trailer relative to the bicycle, such as a hinge, can be resident in the trailer attachment section rather than in the bicycle attachment section. This is in contrast to the illustrated and described embodiment.

The bicycle can comprise any suitable human powered vehicle although a traditional upright bicycle is illustrated. As shown, the hitch is coupled to the seatpost 205 of the bicycle which also permits the hitch and the associated trailer to pivot laterally relative to the bicycle; however, in variations and other embodiments hitches are contemplated that attach to upright bicycles or other types of human powered vehicles at other locations thereon. For instance, the hitch could be coupled to frame of the bicycle with a hinge or other laterally compliant structure being provided to permit side to side movement of the trailer relative to the bicycle. In yet other variations, the hitch's bicycle attachment structure can be attached to the bicycle proximate the rear dropouts wherein the rear wheel is secured to the bicycle frame. It is to be appreciated in this circumstance that the hitch can include frame work that extends from the dropout to a location behind the rear wheel in addition to structure that will permit lateral movement.

A Method of Making a Bicycle Trailer Hitch and an Associated Bicycle Trailer

Embodiments of the trailer hitch can be comprised of any number of suitable materials having sufficient strength to transfer the load between a bicycle and a trailer being pulled therebehind. For instance, the bicycle attachment section and the trailer attachment section can be cast, forged or machined out of an aluminum alloy. Other variations may include sections injection molded out of a carbon fiber and/or glass fiber reinforced plastic, such as but not limited to nylon. In some instances, the various bores provided in the sections can be formed in place or they can be added in a subsequent operation.

The quick release mechanism or other a coupling means is typically obtained from one of a number of readily available sources. The length of the shaft 115 is typically specified to correspond with the dimensions of the bicycle and trailer attachment sections.

The cylindrical spacer is typically comprised of a polymeric material, such as but not limited to nylon or polypropylene. It can be injection molded or in some instances wherein the number of spacers required is small, it can be machined from suitably sized bar or tube stock using, for instance, a lathe.

Typically, the trailer attachment section is fixedly secured to a proximal or front section of the bicycle trailer's frame. In the illustrated embodiment, holes or bores are drilled in various corresponding locations on the tubular frame member and the trailer attachment section. Rivets, bolts or other fasteners are placed through aligned sets of bores and secured in place. In other variations, the frame and trailer attachment section can be joined by any suitable means including but not limited to welding, adhesive bonding, brazing and swaging.

A Method of Using a Bicycle Trailer Hitch and Associate Trailer

To use the trailer hitch 100 and bicycle trailer 300 associated therewith, a user first removes the seatpost 205 from the bicycle 200 that is going to be used to pull the trailer. The tubular portion 145 with an appropriately sized spacer 125 received in it is slid over the shaft of the post. The seatpost is then placed back into the seat tube of the bicycle frame and secured at the appropriate height for a desired rider.

The trailer 300 to which the trailer attachment section 110 is secured is moved behind the bicycle aligning the cylindrical portion 140 of the bicycle attachment section 105 with the cylindrical cavity portion 170 of the trailer attachment section and lowering the cylindrical cavity over the cylindrical portion until the horizontally-extending bores 185A&B and 150 of the sections are aligned.

Next the shaft 115 of the quick release mechanism is slid through the bores and the retaining nut 120A is threaded on to the end of the shaft. Finally, the quick release mechanism is tightened by actuating the quick release lever. The bicycle and trailer combination is then ready to be ridden.

To separate the trailer from the bicycle, a user actuates the quick release lever, to loosen the bolt/shaft, unthreads the nut from the shaft and slides the shaft from the aligned bores. The trailer attachment section can then be lifted off of the bicycle attachment section permitting the user to wheel the trailer to a storage location. The bicycle can be operated with the bicycle attachment section left in place or the section can be removed by removing the seatpost and sliding it off of the seatpost shaft.

Other Embodiments and Variations

The various embodiments of the bicycle hitch, the bicycle trailer, the combination bicycle and trailer and the method of use and making as illustrated in the accompanying figures and/or described above, are merely exemplary and are not meant to limit the scope of the invention. It is to be appreciated that numerous variations to the invention have been contemplated as would be obvious to one of ordinary skill in the art with the benefit of this disclosure. For instance variations and other embodiments of the hitch are contemplated for use on vehicles other than bicycles. All variations of the invention that read upon the claims are intended and contemplated to be within the scope of the invention.

I claim:

1. A bicycle trailer hitch comprising:
   a bicycle attachment section adapted to be coupled with a bicycle, the bicycle attachment section including a cylindrical portion having (i) a cylinder longitudinal center axis generally horizontal to the ground when installed, (ii) a cylinder length and (iii) a cylinder outside diameter; and
   a trailer attachment section adapted to connect with a bicycle trailer, the trailer attachment section including a cavity portion having a shape of a partial cylinder, the cavity portion having (a) an effective cavity longitudinal center axis, (b) a longitudinally extending side having an annular inside surface at least partially defining a cavity, (c) a cavity length and (d) an effective cavity diameter;
   wherein the cylinder length is substantially similar to the cavity length, the cylinder outside diameter is substantially similar to the effective cavity diameter, and the cylindrical portion is adapted to be matingly received in the cavity portion to connect the bicycle to the bicycle trailer and transfer load therebetween during use; and
   wherein the longitudinally extending side of the cavity portion includes an elongated circumferentially-extending notch located at about a longitudinal midpoint location on the longitudinally extending side.

2. The bicycle trailer hitch of claim 1, wherein:
   the cylindrical portion further includes a bore extending therethrough coincident with the cylinder longitudinal center axis;
   the cavity portion includes left and right sidewalls spaced apart by the cavity length and a circumferential sidewall, each sidewall including a bore passing therethrough with the bore including a center axis coincident with the effective cavity longitudinal center axis; and
   the bores of the left and right sidewalls are adapted to align with the bore of the cylindrical portion wherein the cylindrical portion is matingly received in the cavity portion.

3. The bicycle trailer hitch of claim 2, further comprising an elongated shaft, the shaft being adapted to be received through the bore of the cylindrical portion and the bores of the left and right sidewalls when the cylindrical portion is received in the cavity portion.

4. The bicycle trailer hitch of claim 3, wherein the shaft is part of a quick release mechanism.

5. A method of making the bicycle trailer hitch of claim 3, the method comprising:
   fabricating the bicycle attachment section;
   fabricating the trailer attachment section; and
   providing the elongated shaft.

6. A method of using the trailer attachment section of claim 3, the method comprising:
   securing the bicycle attachment section to the bicycle;
   placing the cavity portion over the cylindrical portion aligning the bore of the cylindrical portion with the bores of the left and right sidewalls; and
   sliding the shaft through the bores and securing the shaft in place.

7. A combination of the bicycle trailer hitch of claim 3 and the bicycle trailer, the bicycle trailer comprising at least one wheel and a frame, the frame being attached to the trailer attachment section.

8. The bicycle trailer hitch of claim 2 wherein the left and right sidewalls are substantially parallel to each other.

9. The bicycle trailer hitch of claim 1, wherein the bicycle attachment section further includes a tubular portion connected to the cylindrical portion by a bridge portion, the tubular portion being adapted to be received over a seatpost shaft of the bicycle and having a tube center axis wherein the bridge portion spans between the tubular portion and the cylindrical portion.

10. The bicycle trailer hitch of claim 9 wherein the bridge portion comprises a substantially vertically orientated substantially planar member.

11. The bicycle trailer hitch of claim 9 further comprising a tubular spacer, the tubular spacer having an outside diameter substantially similar to an inside diameter of the tubular portion for receipt therein.

12. The bicycle trailer hitch of claim 1 wherein the bicycle attachment section is comprised of a unitary piece, and the trailer attachment section is comprised of another unitary piece.

13. A combination of the bicycle trailer hitch of claim 1 and the bicycle trailer, the bicycle trailer comprising at least one wheel and a frame, the frame being attached to the trailer attachment section.

14. A bicycle trailer hitch comprising:
   a bicycle attachment section adapted to be coupled with a bicycle, the bicycle attachment section including a cylindrical portion having (i) a cylinder longitudinal center axis generally horizontal to the ground when installed, (ii) a cylinder length and (iii) a cylinder outside diameter; and
   a trailer attachment section adapted to connect with a bicycle trailer, the trailer attachment section including a cavity portion having a shape of a partial cylinder, the cavity portion having (a) an effective cavity longitudinal center axis, (b) a longitudinally extending side having an annular inside surface at least partially defining a cavity, (c) a cavity length and (d) an effective cavity diameter;
   wherein the cylinder length is substantially similar to the cavity length, the cylinder outside diameter is substantially similar to the effective cavity diameter, and the cylindrical portion is adapted to be matingly received in the cavity portion to connect the bicycle to the bicycle trailer and transfer load therebetween during use;
   wherein the bicycle attachment section further includes a tubular portion connected to the cylindrical portion by a bridge portion, the tubular portion being adapted to be received over a seatpost shaft of the bicycle and having a tube center axis wherein the bridge portion spans between the tubular portion and the cylindrical portion;
   wherein the bridge portion comprises a substantially vertically orientated substantially planar member; and
   wherein the longitudinally extending side of the cavity portion includes an elongated circumferentially-extending notch located at about a longitudinal midpoint location on the longitudinally extending side, the circumferentially-extending notch having a circumferential length subtended by an angle of about 80-110 degrees on the cavity portion and adapted to receive the bridge portion therein when the cylindrical portion is matingly received in the cavity portion.

15. A combination of the bicycle trailer hitch of claim 14 and the bicycle trailer, the bicycle trailer comprising at least one wheel and a frame, the frame being attached to the trailer attachment section.

16. A bicycle trailer hitch comprising:
   a bicycle attachment section adapted to be coupled with a bicycle, the bicycle attachment section including,
      a cylindrical portion having (i) a cylinder longitudinal center axis generally horizontal to the ground when installed on the bicycle, (ii) a cylinder length, (iii) a cylinder outside diameter and (iv) a bore extending through the cylindrical portion coincident with the cylinder longitudinal center axis,
      a tubular portion connected to the cylindrical portion by a bridge portion, the tubular portion being adapted to be received over a seatpost shaft of the bicycle, and
      the bridge portion spanning between the tubular portion and the cylindrical portion, the bridge portion comprising a substantially vertically orientated substantially planar member;
   a trailer attachment section adapted to connect with a bicycle trailer, the trailer attachment section including,
      a cavity portion having a shape of a partial cylinder, the cavity portion having (a) an effective cavity longitudinal center axis, (b) a longitudinally extending side having an annular inside surface at least partially defining a cavity, (c) a cavity length, (d) an effective cavity diameter, (e) left and right sidewalls spaced apart by the cavity length and a circumferential sidewall, each sidewall including a bore passing therethrough with the bore including a center axis coincident with the effective cavity longitudinal center axis, and (f) an elongated circumferentially-extending notch located at about a longitudinal midpoint location on the longitudinally extending side, the circumferentially-extending notch having a circumferential length subtended by an angle of about 80-110 degrees on the cavity portion and adapted to receive the bridge portion therein when the cylindrical portion is matingly received in the cavity portion; and
   a fastener including an elongated shaft adapted to be received through the bore of the cylindrical portion and the bores of the left and right sidewalls when the cylindrical portion is received in the cavity portion;
   wherein (1) the cylinder length is substantially similar to the cavity length, (2) the cylinder outside diameter is substantially similar to the effective cavity diameter, (3) the cylindrical portion is adapted to be matingly received in the cavity portion to connect the bicycle to the bicycle trailer and transfer load therebetween during use, and (4) the bores of the left and right sidewalls are adapted to align with the bore of the cylindrical portion wherein the cylindrical portion is matingly received in the cavity portion.

17. The bicycle trailer hitch of claim 16, wherein the fastener comprises a quick release mechanism.

18. The bicycle trailer hitch of claim 16 further comprising a tubular spacer, the tubular spacer having an outside diameter substantially similar to an inside diameter of the tubular portion for receipt therein.

19. A combination of the bicycle trailer hitch of claim 16 and the bicycle trailer, the bicycle trailer comprising at least one wheel and a frame, the frame being attached to the trailer attachment section.

* * * * *